(12) United States Patent
Snyder

(10) Patent No.: US 7,376,738 B2
(45) Date of Patent: May 20, 2008

(54) METHOD OF DYNAMICALLY ALLOCATING USAGE OF A SHARED RESOURCE

(75) Inventor: Richard Keith Snyder, Macedonia, IA (US)

(73) Assignee: West Corporation, Omaha, NE (US)

( * ) Notice: Subject to any disclaimer, the term of this patent is extended or adjusted under 35 U.S.C. 154(b) by 870 days.

(21) Appl. No.: 10/734,958

(22) Filed: Dec. 11, 2003

(65) Prior Publication Data

US 2005/0144281 A1    Jun. 30, 2005

(51) Int. Cl.
*G06F 15/173* (2006.01)
(52) U.S. Cl. ..................................... 709/226
(58) Field of Classification Search ............... 709/226; 700/99–102
See application file for complete search history.

(56) References Cited

U.S. PATENT DOCUMENTS

2002/0120744 A1* 8/2002 Chellis et al. .............. 709/226
2003/0167329 A1* 9/2003 Kurakake et al. .......... 709/226

* cited by examiner

Primary Examiner—Krisna Lim

(57) ABSTRACT

A method of dynamically allocating usage of a shared resource between user A and user B includes the steps of establishing an initial allocation percentage for user B for using the shared resource and establishing a threshold allocation percentage for user B. The allocation percentage is modified for user B based on the availability of the shared resource to user A. If the shared resource is unavailable to user A, the allocation percentage for user B is decreased. If the shared resource is available to user A, the allocation percentage for user B is increased. Usage of the shared resource by user B is allocated in accordance with the modified allocation percentage provided that the modified allocation percentage is less than a pre-set threshold level. The method is particularly useful in dynamically allocating telephone calls into call centers.

14 Claims, 3 Drawing Sheets

METHOD OF DYNAMICALLY ALLOCATING USAGE OF A SHARED RESOURCE

FIELD OF THE INVENTION

The present invention relates generally to systems and methods of allocating usage of a shared finite resource. The invention is applicable to any finite resource that is shared. The invention is particularly useful in dynamically allocating telephone calls into call centers.

BACKGROUND OF THE INVENTION

In a many business situations, a particular finite resource may be shared by multiple users. Call centers, for example, are one area where usage can be shared among multiple users. Take for instance the scenario where there are two call centers (A and B) fielding telephone calls. Both call centers are populated with a finite number of agents and can thus handle only a certain volume of calls. Call centers A and B may experience drastically different usage patterns at any given time. For example, at a particular time, call center A may have a surplus of available agents while at the same time, call center B may have reached its maximum capacity. Calls that are directed to call center B may not go through because all available resources (i.e., agents) are currently being used.

In situations like the one described above, it is advantageous to divert a portion of the call traffic that would otherwise go to call center B to call center A. In this regard, the excess capacity at call center A is utilized to field calls from a portion of the calls originally directed to call center B. Of course, only a certain number of calls can be diverted to call center A without overloading call center A's excess capacity.

Various solutions have been proposed and used to route customers to various call centers. One proposed solution is a carrier-based network routing scheme which uses a fixed or static allocation percentage to define how calls are allocated among several call centers. In the above scenario, for example, call center B may divert 20% of its calls to call center A. The problem with this approach is that static percentage allocations cannot take into account variances such as agent availability, call handling times, and call volume changes. For example, setting an allocation percentage too low will leave excess agents at call center A, therefore not maximizing the resources that are available at a given time. Conversely, setting an allocation percentage too high will swamp call center A, thereby blocking callers from reaching call center A. Of course, these problems could be remedied to a certain extent by manually reprogramming the allocation percentage but this would require near constant monitoring and time-consuming reprogramming.

Private networking routing solutions have also been used to balance call loads among a variety of call centers. Many Automatic Call Distributor (ACD) vendors provide overflow routing between their own ACD systems. When one particular ACD approaches its maximum capacity, calls are redirected to another ACD that has a lighter call load. While private network routing systems does provide some advantages over the above-mentioned static allocation percentage approach, private network routing solutions suffer from a number of drawbacks. First, these systems require the use of the same ACD and routing software at each location. Second, a significant amount of hardware is needed to implement the private network solution. Finally, when call overflowing is implemented in private network routing solutions, twice as many resources are consumed for each overflowed call.

More recently, software-based telephony integration systems have been employed to create a virtual call center enterprise. One such system is CISCO's Intelligent Contact Management (ICM) Software. ICM uses an open, distributed software architecture that manages voice and data distribution across enterprise. The software processes a combination of customer and contact center data by using user-defined routing scripts that reflect a company's business rules. The ICM software is then able to route each contact to the optimum resource anywhere in the enterprise. While software-based solutions like CISCO's ICM provide a robust solution to allocate calls efficiently within an enterprise, they are extremely expensive to deploy. Implementation of such systems can cost well over $1,000,000 leaving such systems suitable for only the largest of call centers.

There thus is a need for a relatively low cost, robust system that is able to dynamically allocate calls among a plurality of call centers. The system preferably requires little in the way of hardware to implement. In addition, the system would advantageously not require manual reprogramming in order to respond to changing load conditions at one or more call centers. The method could also apply to other non-call center situations where a finite resource is shared among multiple users.

SUMMARY OF THE INVENTION

In a first aspect of the invention, a method of dynamically allocating usage of a shared resource between users A and users B is provided. The method includes the steps of establishing an initial allocation percentage for user B for using the shared resource and establishing a threshold allocation percentage for user B. The allocation percentage is modified for user B based on the availability of the shared resource to user A. If the shared resource is unavailable to user A, the allocation percentage for user B is decreased. If the shared resource is available to user A, the allocation percentage for user A is increased. Usage of the shared resource is allocated in accordance with the modified allocation percentage provided that the modified allocation percentage is less than the threshold allocation percentage.

In another aspect of the invention, the method according to the first aspect of the invention includes the further steps of establishing an initial allocation percentage for user C using the shared resource, establishing a threshold allocation for user C, and modifying the allocation percentage for user C based on the availability of the shared resource to user A. The allocation percentage for user C is either increased or decreased depending upon the availability of the shared resource to user A. The allocation percentage for user C does not exceed the threshold allocation percentage.

In still another aspect of the invention, a system for dynamically allocating use of a shared resource between users A and users B includes means for switching users B to the shared resource based on an allocation percentage and means for determining the allocation percentage based on the availability of the shared resource to users A. The means for switching may include by way of example a telephone switch, a network switch, or similar switching device. The means for determining the allocation percentage preferably includes software. A database is also provided for storing a counter corresponding to the availability of the shared resource to users A, a counter used to determine allocation percentage, and a threshold counter.

In still another aspect of the invention, a method of dynamically allocating usage of a call center is provided. The method includes the steps of establishing an initial allocation percentage for a first set of callers for using the call center and establishing a threshold allocation percentage for the first set of callers. The allocation percentage is modified for the first set of callers based on the availability of the call center to a second set of callers. If the call center is unavailable to a caller of the second set, the allocation percentage for the first set of callers is decreased. If the call center is available to a caller of the second set, the allocation percentage for the first set of callers is increased. Usage of the call center is allocated in accordance with the modified allocation percentage provided that the modified allocation percentage is less than the threshold allocation percentage.

It is thus an object of the invention to provide a relatively inexpensive system and method for dynamically allocating usage of a shared resource among a plurality of users. The system and method can be employed in any situation where a finite resource is shared between multiple users. The invention has particular applicability to call centers, shared computer networks, and telecommunication networks operating with finite bandwidth levels.

DETAILED DESCRIPTION OF THE PREFERRED EMBODIMENTS

Figure 1:
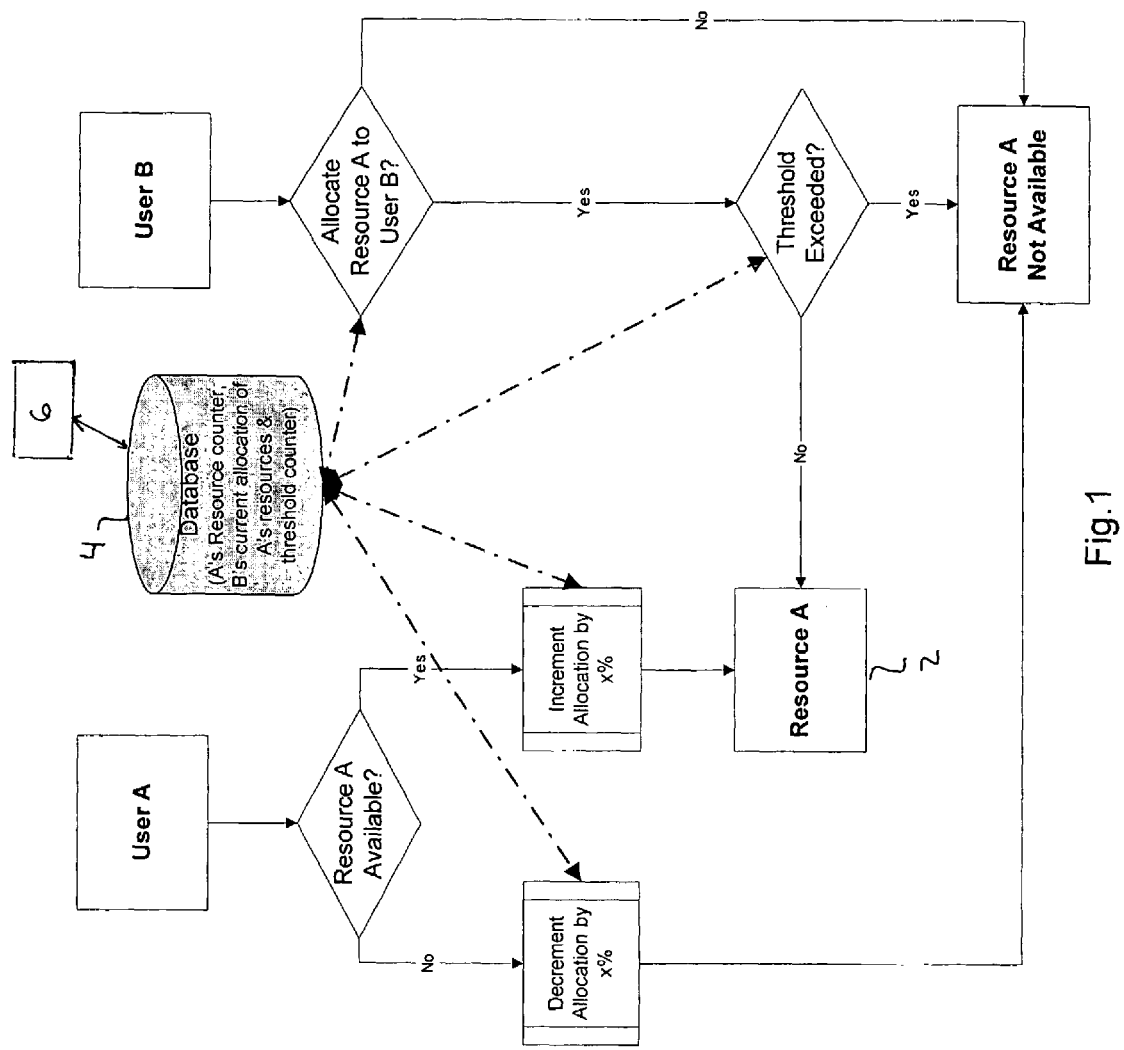
FIG. 1 is a flow chart showing a preferred method of the invention in which B users are dynamically allocated to a shared resource (A's resource).

FIG. 1 illustrates a flow chart showing a preferred embodiment of the invention. In the depiction shown in FIG. 1, it is assumed that user B is in need of resource A. User A is also directed to resource A. In this scenario, resource A has a surplus capacity that can handle A users and B users. As used herein, a user is referred to in its broadest sense in that it may include person or thing that utilizes a particular finite resource. Depending on the context in which the invention is used, a user may be, for example, a caller calling into a call center, a software program utilizing computing resources of a processor, a communication device utilizing a transmission media having a finite bandwidth, and the like.

Referring back to FIG. 1, the invention provides a relatively inexpensive method of dynamically allocating usage of a shared resource. In the embodiment illustrated in FIG. 1, the shared resource 2 is shown as resource A. The shared resource 2 may include any resource that has a finite capacity. This may include resources such as, for example, agent availability at a call center, computing power, bandwidth, and the like. In the embodiment of FIG. 1, the goal is to divert a portion of B users to resource A. The diversion may be needed because, for example, resource B which would typically handle user B is unavailable or at maximum capacity.

While resource A has surplus capacity and can take a portion of B users, there is a finite limit to the amount of B users that can be allocated to resource A. The present invention solves this dilemma by dynamically altering the percent of B users that are allocated to resource A. When an A user is unable to access resource A because its capacity is full, the percent allocation of B users to resource A is reduced to thereby free up capacity. Conversely, when an A user is able to access resource A, the percent allocation of B users to resource A is increased to take advantage of the excess capacity.

The invention also contemplates a threshold level that will "cap" the amount of B users that are diverted to resource A. This threshold level is preferably expressed as an allocation percentage. Thus, the allocation percentage, which is dynamically changing based on the utilization of resource A, will never exceed the threshold level. The threshold level is set within the range of 0% to 100%. At the 100% setting there is effectively no "cap" placed on the allocation percentage.

Still referring to FIG. 1, a decision is first made on whether to allocate the B user to resource A. This decision is made based on the allocation percentage that exists at a particular time. The allocation percentage, as stated above, is dynamically changing based on the load conditions of resource A. The allocation percentage or equivalent indicator thereof is stored in a database 4 that is updated with data based on the availability of resource A. The number of B users that are diverted to resource A is chosen such that, on average, the allocation of B users to resource A matches the allocation percentage. This may be accomplished, for example, by recording a running tally or counter in a database 4 of all B user requests to use resource A.

Based on the allocation percentage, B users are then diverted to one of two paths. In a first path, as seen in FIG. 1, resource A is unavailable to user B. In a second path, however, user B is eligible to use resource A. User B will be able to use resource A only if the use will not cause the threshold level to be exceeded. In a preferable embodiment, this determination is made by comparing the allocation percentage with a threshold percentage. The threshold percentage or an equivalent indicator such as a counter is also stored in the database 4. If the allocation percentage is less than or equal to the threshold percentage, then user B will be able use resource A. If the allocation percentage is greater than the threshold percentage, then user B is not permitted access to use resource A.

Referring now to the user A side of FIG. 1, a determination is made on whether or not resource A is available for user A. In the event that resource A is not available to user A, the allocation percentage is reduced by a certain amount. This decrement may be expressed in a form of a percentage decrease. In the event that resource A is available to user A, the allocation percentage is increased by a certain amount. This increase may also be expressed in the form of a percentage increase. To initiate the method described herein, the allocation percentage is initially seeded with an initial allocation percentage.

Figure 2:
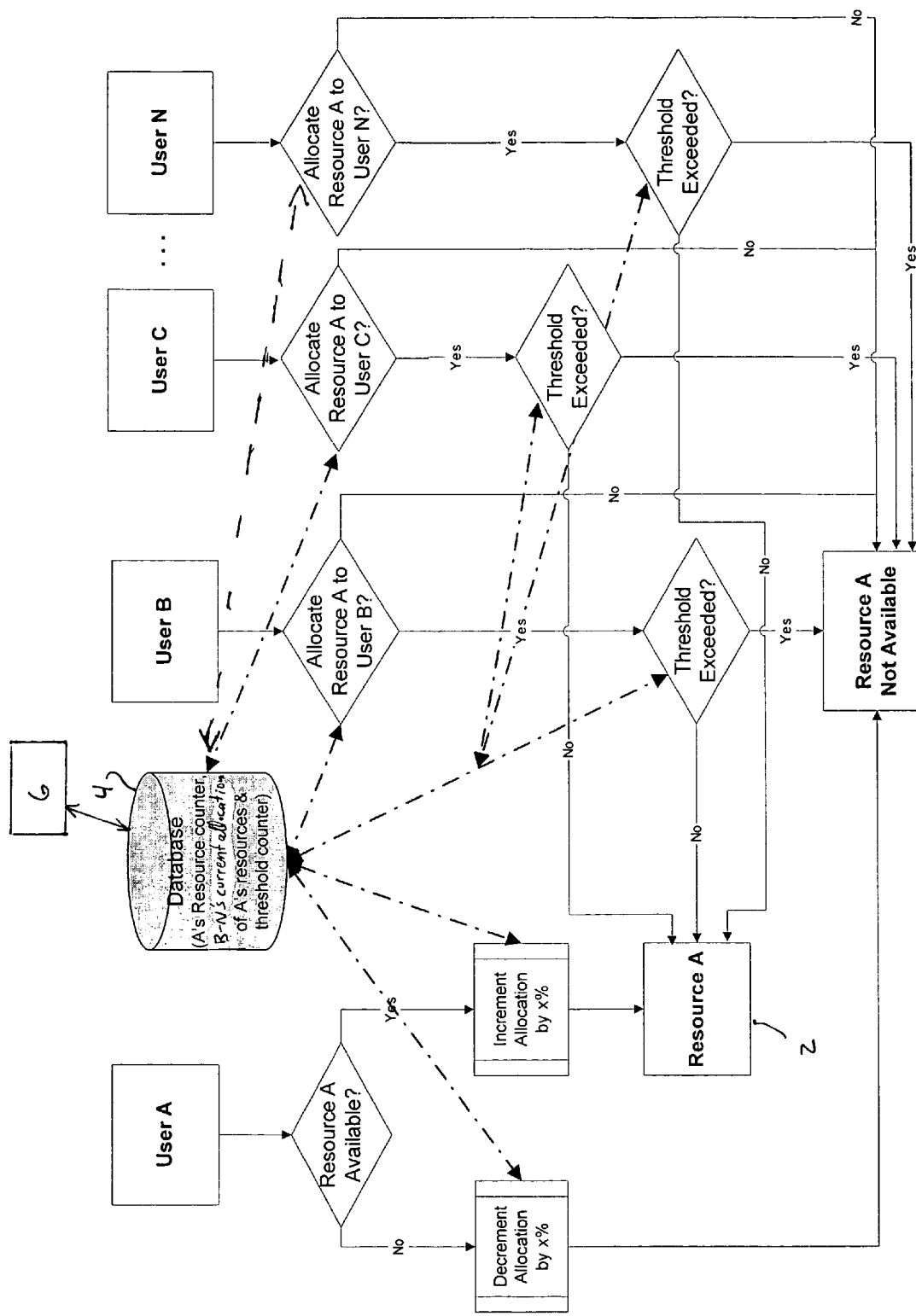
FIG. 2 is a flow chart showing a preferred method of the invention in which a plurality of users are dynamically allocated to a shared resource (A's resource).

FIG. 2 shows an alternative embodiment of the invention. In this embodiment, additional users (C . . . Nth user) are allocated to resource A. The basic method of dynamic allocation used in this embodiment is the same as the method described above with respect to two users (A and B users). In this multiple user embodiment, however, additional information is stored in the database 4 with respect to the additional users. This includes, for example, the allocation percentage for users C through N or an equivalent indicator thereof. The allocation percentages are updated with data based on the availability of resource A.

In one preferred embodiment of the invention, the allocation percentage is modified equally among the various users (B through Nth user). In this regard, if resource A is unavailable to user A, the allocation percentage for user B through the Nth user is decremented an equal amount. Conversely, if resource A is available to user A, the allocation percentage for user B through the Nth user is increased an equal amount.

In an alternative embodiment of the invention, the allocation percentages for multiple users (or even a single user) are not treated equally. In this regard, certain users are given priority access to use resource A. For example, user B might be given priority by increasing user B's allocation percentage to a greater extent than the other users (i.e., user C through user N). Similarly, user B might be given priority by decreasing user B's allocation to a smaller extent than the other users.

Figure 3:
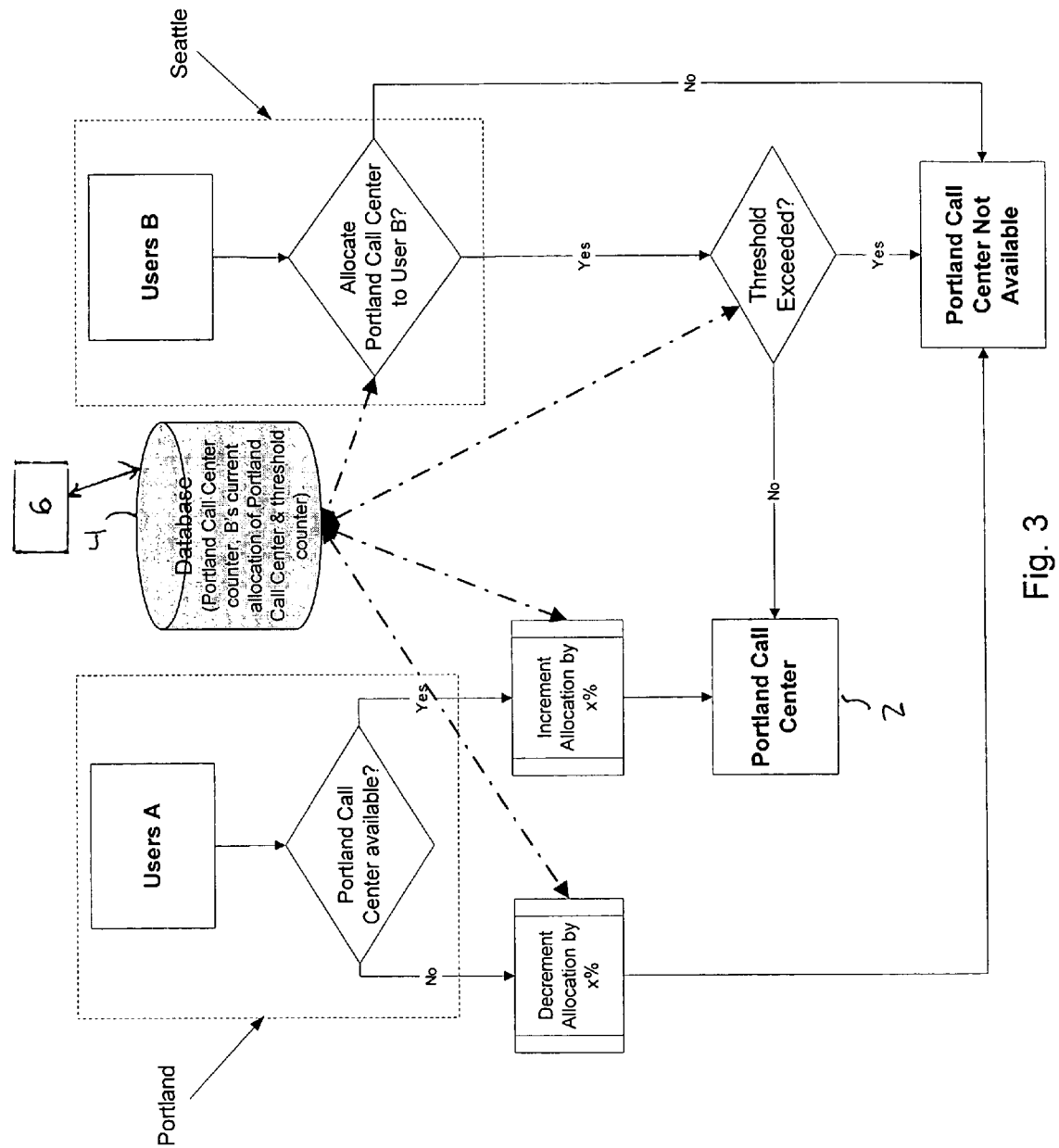
FIG. 3 is a flow chart showing a preferred method of the invention in which a portion of callers originally directed to a Seattle call center are diverted to a Portland call center to utilized Portland's excess capacity.

In one preferred application of the invention, as shown in FIG. 3, the method is used to allocate calls to a shared call center (shared resource 2). For illustrative purposes, FIG. 3 represents a situation where a first call center is located in Portland and a second call center is located in Seattle. Under normal conditions, a first set of callers (users A) are directed to the Portland call center while a second set of callers (users B) are directed to a Seattle call center. When the Seattle call center is unavailable to take callers from the second set of callers (users B), it is desirable to shunt a certain percentage of callers to the Portland call center, which has a surplus number of agents waiting to field calls.

In accordance with the invention, an initial allocation percentage is established for the second set of callers to the Seattle call center. This is typically established either manually or automatically pursuant to set of pre-defined business rules. The allocation percentage may initially be "seeded" with an allocation percentage of, for instance, 10%. In addition to establishing an initial seed allocation, a threshold level is set such that the second set of callers to the Seattle call center will not swamp and overload the resources of the Portland call center. Like the initial allocation percentage, this is typically established either manually or automatically pursuant to a set of pre-defined business rules. The operator of the Portland call center would generally have control over the threshold value.

With these two parameters set, calls to the Seattle call center are either diverted to the Portland call center or not. This diversion is made in accordance with the allocation percentage in existence at that particular time. As stated above, the allocation percentage dynamically changes based on the available of resources (i.e., agents in this example) at the Portland call center. When a caller from the first set of callers to the Portland call center is successful, the allocation percentage is increased by a certain percentage. Conversely, when a caller from the first set of callers is not successful in reaching the Portland call center, the allocation percentage is decreased by a certain percentage.

Calls from the second set of callers are diverted from Seattle to Portland in accordance with the established allocation percentage set at that time provided, however, that the allocation percentage does not exceed the established threshold level. Typically, the threshold level is expressed in terms of a maximum allocation percentage which falls within the range of 0 to 100%.

In this particular application of the invention, a shared database 4 is used to store the current allocation percentage or an equivalent indicator such as a counter. The database 4 also stores the threshold allocation percentage or an equivalent indicator such as a counter. Finally, the database 4 contains a counter that is used to track all attempts by the second set of callers to use the Portland call center. The method is preferably software 6 driven in that software 6 is used to calculate the current allocation percentage based on the availability at the Portland call center. Software 6 is also used compare the allocation percentage with the pre-set threshold level. In addition, software 6 is used to control the diversion of calls to the Portland call center. This is accomplished by software control of one or more ACD, PBX, or network switches. For other non-call center applications, a user is diverted by the use of a switch or the like.

The present invention provides a relatively low cost solution to dynamically allocate usage of a shared resource among a plurality of users. The system and method does not require manual re-programming to adjust allocation percentages as this function is done on the fly as load conditions change. Finally, there is relatively little additional hardware needed to implement the system.

While the invention is susceptible to various modifications, and alternative forms, specific examples thereof have been shown in the drawings and are herein described in detail. It should be understood, however, that the invention is not to be limited to the particular forms or methods disclosed, but to the contrary, the invention is to cover all modifications, equivalents and alternatives falling within the spirit and scope of the appended claims.

What is claimed is:

1. A method of dynamically allocating usage of a shared resource between users A and users B comprising the steps of:
    establishing an initial allocation percentage for user B for using the shared resource;
    establishing a threshold allocation percentage for user B;
    modifying the allocation percentage for user B based on the availability of the shared resource to user A, wherein if the shared resource is unavailable to user A the allocation percentage for user B is decreased and wherein if the shared resource is available to user A the allocation percentage for user B is increased; and
    allocating usage of the shared resource to user B in accordance with the modified allocation percentage provided that the modified allocation percentage is less than the threshold allocation percentage.

2. The method of claim 1, wherein the shared resource is a call center.

3. The method of claim 1, wherein the shared resource is computing resources.

4. The method of claim 1, wherein the shared resource is communication bandwidth.

5. The method of claim 1, wherein the threshold allocation percentage is less than 100%.

6. The method of claim 5, further comprising the step of modifying the threshold allocation percentage.

7. The method of claim 1, further comprising the steps of:
    establishing an initial allocation percentage for user C for using the shared resource;
    establishing a threshold allocation percentage for user C;
    modifying the allocation percentage for user C based on the availability of the shared resource to user A, wherein if the shared resource is unavailable to user A the allocation percentage for user C is decreased and wherein if the shared resource is available to user A the allocation percentage for user C is increased; and
    allocating usage of the shared resource to user C in accordance with the modified allocation percentage provided that the modified allocation percentage is less than the threshold allocation percentage.

8. The method according to claim 7, wherein the allocation percentage is modified to a greater extent for user B than for user C.

9. A system for dynamically allocating use of a shared resource between users A and users B comprising:
   means for switching users B to the shared resource based on an allocation percentage;
   means for determining the allocation percentage based on the availability of the shared resource to users A; and
   a database storing a counter corresponding to the availability of the shared resource to users A, the allocation percentage, and a threshold allocation percentage.

10. The system of claim 9, wherein the shared resource is a call center.

11. The system of claim 9, wherein the shared resource is computing resources.

12. The system of claim 9, wherein the shared resource is communication bandwidth.

13. The system of claim 9, further comprising means for switching users C to the shared resource based on an allocation percentage established for users C and means for determining the allocation percentage based on the availability of the shared resource to users A.

14. A method for dynamically allocating calls to a call center comprising the steps of:
   establishing an initial allocation percentage for a first set of callers for using the call center;
   establishing a threshold allocation percentage for the first set of callers;
   modifying the allocation percentage for the first set of callers based on the availability of the call center to a second set of callers, wherein if the call center is unavailable to a caller of the second set the allocation percentage for the first set of callers is decreased and wherein if the call center is available to a caller of the second set the allocation percentage for the first set of callers is increased; and
   allocating usage of the call center to the first set of callers in accordance with the modified allocation percentage provided that the modified allocation percentage is less than the threshold allocation percentage.

* * * * *